United States Patent
Nickolay et al.

(10) Patent No.: US 7,055,588 B2
(45) Date of Patent: Jun. 6, 2006

(54) PLATE HEAT EXCHANGER

(75) Inventors: Markus Nickolay, Bruchsal (DE); Volker Wagner, Mühlacker (DE)

(73) Assignee: API Schmidt-Bretten GmbH & Co. KG, Bretten (DE)

( * ) Notice: Subject to any disclaimer, the term of this patent is extended or adjusted under 35 U.S.C. 154(b) by 0 days.

(21) Appl. No.: 10/846,397

(22) Filed: May 14, 2004

(65) Prior Publication Data

US 2004/0251003 A1    Dec. 16, 2004

(30) Foreign Application Priority Data

May 16, 2003    (DE) ................ 103 22 406

(51) Int. Cl.
*F28F 3/10* (2006.01)
(52) U.S. Cl. ..................... 165/167
(58) Field of Classification Search ............. 165/167, 165/166, 916
See application file for complete search history.

(56) References Cited

U.S. PATENT DOCUMENTS

| | | | |
|---|---|---|---|
| 2,248,933 A * | 7/1941 | Astle | 165/167 |
| 4,572,766 A * | 2/1986 | Dimitriou | 165/167 |
| 2003/0047303 A1 * | 3/2003 | Andersson | 165/167 |
| 2004/0069473 A1 * | 4/2004 | Blomgren et al. | 165/167 |

FOREIGN PATENT DOCUMENTS

| | | | | |
|---|---|---|---|---|
| DE | 32 20 774 A1 | 12/1983 | | |
| DE | 3244547 A1 * | 6/1984 | | 165/166 |
| DE | 36 41 458 A1 | 6/1988 | | |
| DE | 39 05 066 A1 | 8/1990 | | |
| DE | 197 19 257 C2 | 9/2002 | | |
| DE | 102 60 060 A1 | 7/2003 | | |
| GB | 2218794 A * | 11/1989 | | 165/166 |
| JP | 56000993 A * | 1/1981 | | 165/167 |
| WO | WO 01/90671 A1 | 11/2001 | | |

* cited by examiner

*Primary Examiner*—Leonard R. Leo
(74) *Attorney, Agent, or Firm*—Akin Gump Strauss Hauer & Feld, LLP (57) ABSTRACT

A heat transfer plate is provided for a plate heat exchanger, the plate having a heat transfer area and peripheral openings for the heat transfer media, namely a product to be at least partially evaporated or condensed on the one hand and a heating or cooling medium on the other hand. A first group of the openings is allocated to one medium and to one side of the plate, and a second group of the openings is allocated to the other medium and the other side of the plate by appropriately placed seals. The group of openings allocated to the product to be evaporated comprises a plurality of adjacent inlet openings on the inlet side of the plate, the inlet openings ending directly in the heat transfer area of the plate at approximately a right angle to the adjacent plate edge.

19 Claims, 8 Drawing Sheets

PLATE HEAT EXCHANGER

BACKGROUND OF THE INVENTION

The invention relates to heat transfer plates for a plate heat exchanger functioning as an evaporator and/or condenser. The plates have a heat transfer range and peripheral openings for the heat transfer media, namely at least one product to be partially evaporated or condensed on the one hand, and a heating or cooling medium on the other hand. One group of the openings is allocated to one medium and one side of the plate, and another group of the openings is allocated to the other medium and the other side of the plate by appropriately placed seals.

Heat transfer plates of this type are stacked to form a packet, so that the product or the heating/cooling medium flows alternately in the spaces between the plates. The plates are known in a great variety of designs and profiles and are distinguished by a high heat transfer output due to the split flow.

Usually, the openings are arranged in the four corners of the plate, such that two diagonally opposite openings serve as the inlet opening and outlet opening for one medium, while the two other diagonally opposite openings are separated by seals from the first medium and are used for the flow of the second medium to the next space between the plates.

However, other positions for the openings in the plate are also already known. Thus, German Patent DE 32 20 774 of the present applicant describes a plate evaporator or condenser in which the plates have laterally protruding projections in those openings, so that continuous channels are produced. These channels are used especially for supplying heating steam. In addition, International application publication WO 01/90671 discloses a heat transfer plate which has two inlet openings closely adjacent to one another in the lower, middle area from which the medium first enters an intermediate chamber, so that the partial flows coming from the two inlet openings intermix. The medium then flows along the heat transfer area to the other plate edge into a common central outlet opening.

BRIEF SUMMARY OF THE INVENTION

Based on this known prior art, an object of the present invention is to produce a more uniform flow of the inlet medium into the plate gap and thus achieve more homogeneous conditions for heat transfer and for the product temperature. As a result, the new plate distinguishes itself by more cost-effective production and greater operational reliability.

According to the invention, this object is achieved in that the group of openings on the inlet side of the plate allocated to the product to be evaporated comprises a plurality of adjacent inlet openings which open directly in the heat transfer area of the plate in a direction almost at a right angle to the adjacent plate edge, i.e. without the previously described mixing chamber.

This results in the following advantages: First, the inlet openings can extend over almost the entire width of the heat transfer area and thus produce a considerably more uniform admission to the plate gap over its width. Differences in temperature in transverse direction of the plate gap are thereby almost eliminated, and the heat treatment of the product can be more easily and more precisely reproduced than previously. Second, the direct alignment of the inflowing medium into the heat transfer area leads to a lower loss in pressure, while omitting an intermediate chamber in which mixing effects are bound to result.

Theoretically, the inlet openings could also be arranged cornerwise. However, it is especially useful if they are arranged only along a narrow side of the plate and extend over almost the entire width of the heat transfer area. In particular, therefore, the inlet openings should be adjacent to one another on the same side of the plate and without sealed flow-through openings between them for the other medium.

In a further embodiment of the invention, it is recommended that the seals arranged on the outside of the inlet openings each extend into the space between adjacent inlet openings. As a result, transverse flows and mixtures are prevented between the arriving partial flows, which would produce a loss in pressure. In particular, this is true if the aforementioned seal extends further into the space between adjacent inlet openings than corresponds to the diameter of the inlet openings.

Advantageously, the seal should thus extend about the inlet openings, so that it offers a flow cross section expanding in the direction of the heat transfer area at each inlet opening. Thus, the seal should only extend about the outer peripheral area of the inlet opening and expand toward the space between the plates, so that it forms guide edges there which run diagonally into the space along the lines of a fanning of the flow cross section from the smaller flow width in the inlet opening to a larger flow width in the plate gap. The individual flows thus achieve an optimal alignment toward the heat transfer area.

In a further embodiment of the invention, the heat transfer area is profiled at least in the plate half allocated to the inlet openings, in such a way that a plurality of almost straight individual channels, which extend in a longitudinal direction of the plate, are produced in combination with the profiling of the adjacent plate. Thus, in this case, the attachment of diagonal ribs, projections distributed in a grid-like fashion, and a deviation of the flow produced thereby are intentionally omitted in order to make do with as low a loss of pressure as possible. Thus, this design is especially suitable for evaporating the product in a vacuum.

The adjoining remaining heat-transfer area, which is allocated to the inlet openings for the heating medium on the other plate side, preferably has a different profiling, i.e. one that allows both longitudinal and diagonal flows on the heating medium side. As a result, the possible transfer flow on the rear side of the plate facilitates the distribution of the heating medium coming from the outside over the entire plate width. Two relatively large outlet openings are provided in the plate for the vapor outlet.

Another concept of the invention provides that the plate have several steam channels arranged adjacent to one another in a longitudinal direction of the plate and a condensate channel, each for the heating or cooling medium on at least one longitudinal edge. These steam channels and the condensate channel are no longer formed as before by so-called "projecting ears," but are within the almost rectangular plate contour, preferably the entire longitudinal edge, on one side or both sides of the plate, being formed by steam and condensate channels. The essential advantage of providing several steam channels integrated in the plate is that steam channels can be interconnected internally, i.e. within the plate stack. The previously required reversing lines and connections mounted on the outside are thus no longer required. Instead, it is only necessary to omit the seal between adjacent steam channels on some plates until a transitional area having a sufficient cross section is available.

Of course, the aforementioned internal connection possibility is also feasible for the condensate channels.

In a further advantageous embodiment of the invention, the condensate channel is surrounded by a seal which comprises an area which is at least 50%, preferably at least 75%, of the area which is surrounded by the seal of the steam channel furthest removed from the condensate channel. As a result, the condensate channel can be cut out of the plate substantially larger than what would actually be required for the pure condensate discharge, in particular, the condensate channel can be made with a cross section that is similar in size to a steam channel. This results in the advantage that the condensate channel can also be selectively used as a steam channel. This means that the same plate can be selectively used as a rising film or falling film evaporator. To this end, it must only be turned by 180° about its transverse axis.

Moreover, the described oversizing of the area surrounded by the seal of the condensate channel offers the possibility of providing a further channel for the condensate exhaust within this area and above the condensate channel. As a result, an air separator on the outside of the plate heat exchanger can be omitted.

Not least, the steam channels arranged adjacent to one another enable the use of unused steam channels for drawing in clamps for pressing the plate packet together.

Of course, it is also within the scope of the invention that the plate have, in a known manner, a central seal passing in a longitudinal direction on at least one side, such that two separate, adjacent flow cross sections are produced. This separation may also be realized by dividing the plate in the central longitudinal direction into two separate plate halves, which fit together in the composite construction with the divided or undivided plates. The advantage of plates divided in this way is that, due to the smaller plate area, only smaller pressure forces are required, and the layout of plates as a whole can be adapted in a more individual manner to the requirements of the user, e.g. such that two evaporating steps are carried out with only one apparatus.

Plate halves divided in this way also offer the possibility of placing clamps in the intermediate space for pressing the plate packet together.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
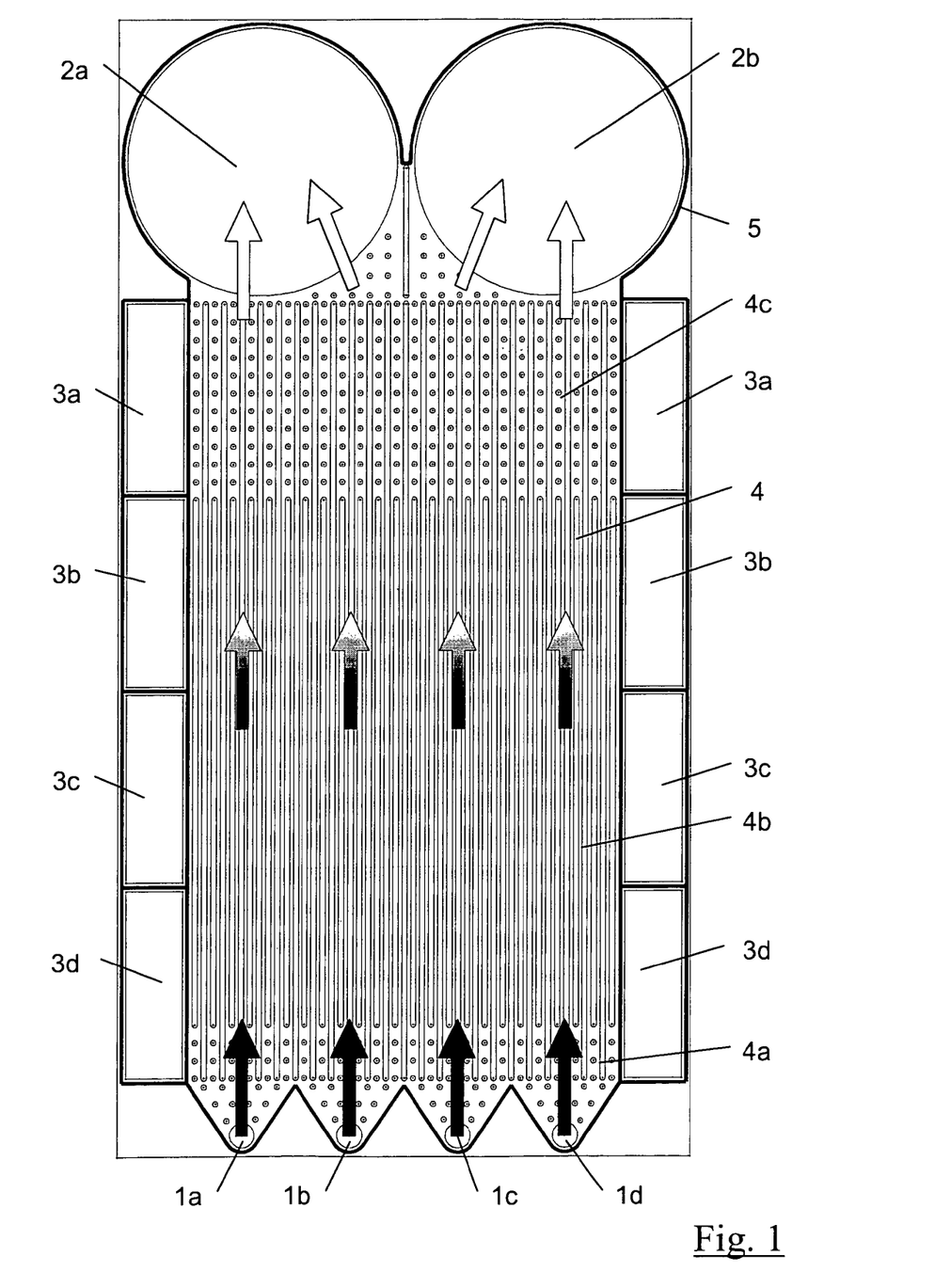
FIG. 1 is a plan view of the product side of a plate according to one embodiment of the invention with a rising film evaporation.

As the drawings show, the plate has an essentially rectangular outer contour. In FIG. 1, the product is supplied via four inlet openings 1$a$ to 1$d$ arranged on the lower narrow side of the plate and distributed uniformly over this narrow side, while the steam product is discharged via two outlet openings 2$a$, 2$b$, which are arranged on the upper narrow side of the plate, and each extends over almost half of the plate width.

Four almost rectangular channels each are arranged within the rectangular plate contour on both longitudinal sides of the plate, the channels being used in this embodiment for supplying and discharging a heating medium. In this case, the three upper channels 3$a$, 3$b$, 3$c$ of each side function as steam channels, whereas the lower channel 3$d$ on each side serves as a condensate channel. The channels are arranged directly above one another.

Figure 5:
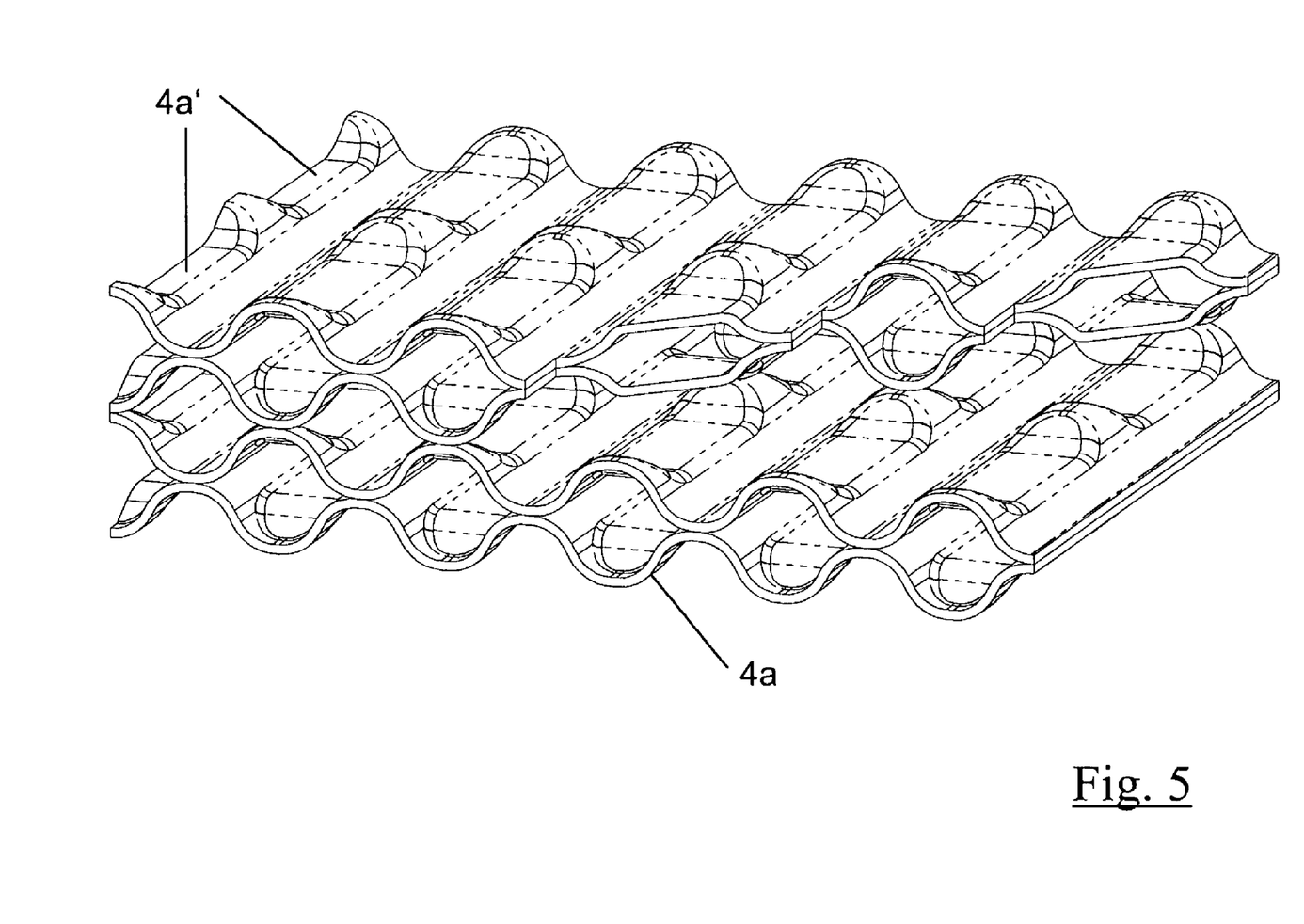
FIG. 5 is an end perspective view of a section of profiling in the inlet area of the heating medium according to an embodiment of the invention.

The heat transfer area 4 is situated between the inlet and outlet openings on the narrow sides of the plates and the channels on the longitudinal sides of the plates. The heat transfer area 4 first has a knob-like profiling on the lower end, in the area of the inlet openings 1$a$ to 1$d$, and then passes into a profiling 4$a$ which is shown in greater detail in FIG. 5. In association with the corresponding profiling of the adjacent plate, it forms a plurality of small, straight flow channels in the longitudinal direction of the plate through which the product flows upward. However, on the side facing away from the product, the surfaces of the channels have a plurality of successive indentations 4$a'$ spaced from one another. In this way, the profiling enables the heating or cooling medium to flow not only in a longitudinal direction but also in a transverse direction.

Figure 6:
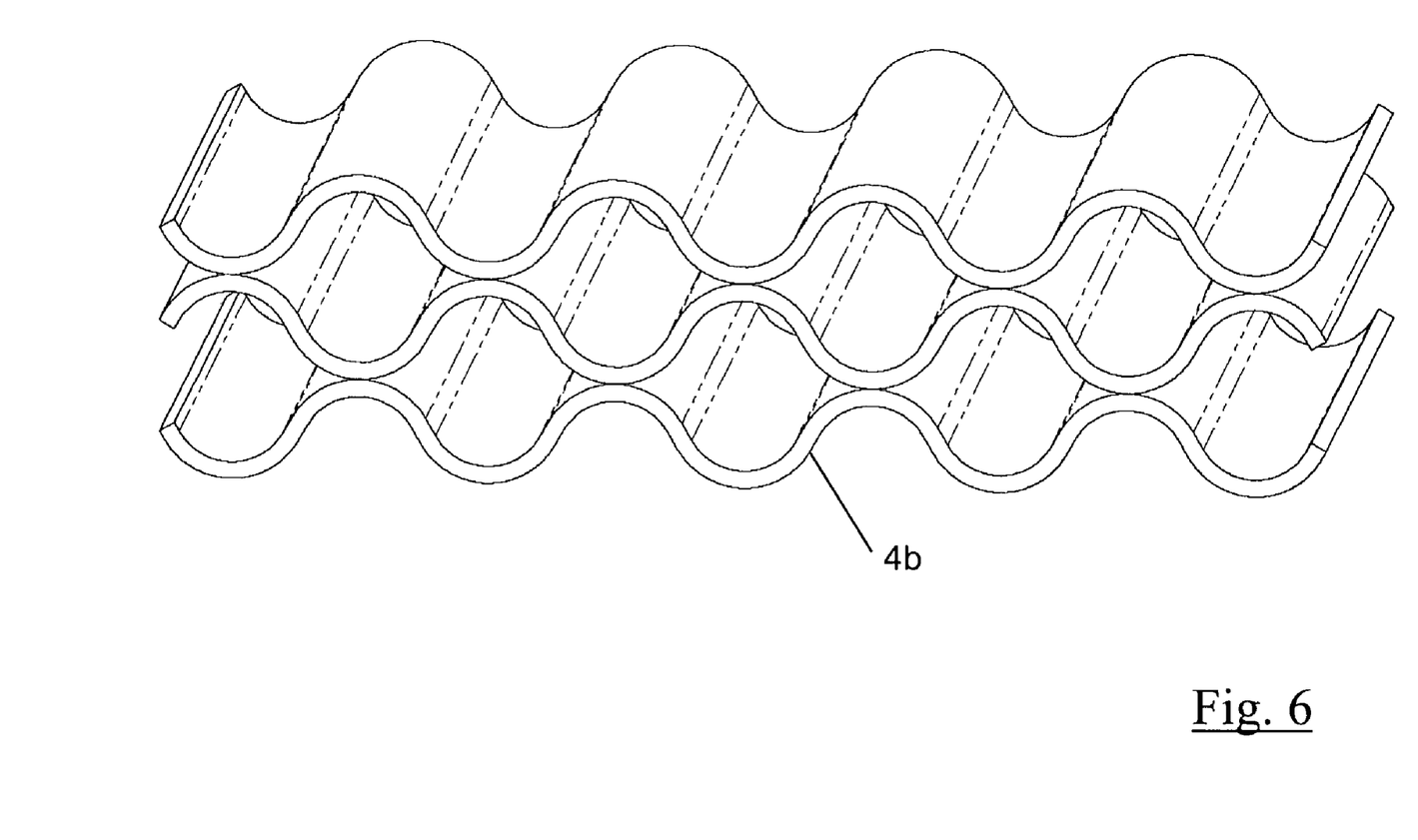
FIG. 6 is an end perspective view of a section of profiling in the central heat transfer area according to an embodiment of the invention.

This is followed by an undulated profiling 4$b$ which is shown in FIG. 6. It is configured and oriented in association with the corresponding profiling of the adjacent plate, such that a plurality of small, straight partial flows is produced in the longitudinal direction of the plates by which the product flows upward. In this case, a transverse flow is not provided either for the product nor for the heating or cooling medium. However, this can be allowed by indentations as in FIG. 5. The undulated profiling 4$b$ extends over about two-thirds of the height of the heat transfer area.

The remaining upper area is formed by a profiling 4$c$ which allows longitudinal and transverse flow of the product and also of the heating or cooling medium. This area is situated at the level of the upper steam channels 3$a$.

On the product side of the plate, shown in FIG. 1, the seal 5 is placed such that the heat transfer area 4 is connected to the inlet openings 1$a$ to 1$d$ and to the outlet openings 2$a$ and 2$b$ for the product, whereas the steam and condensate channels 3$a$ to 3$d$ are sealed off with respect to the heat transfer area. In this case, each of the seals 5 extends in a funnel-shaped manner about the inlet openings 1$a$ to 1$d$, such that the flow width increases continuously from the inlet opening to the heat transfer area 4 until the seal bends sharply, in order to travel about the next inlet opening in a funnel-like manner. In this way, the flows coming from the inlet openings 1a to 1d are uniformly distributed over the full width of the heat transfer area 4.

Figure 2:
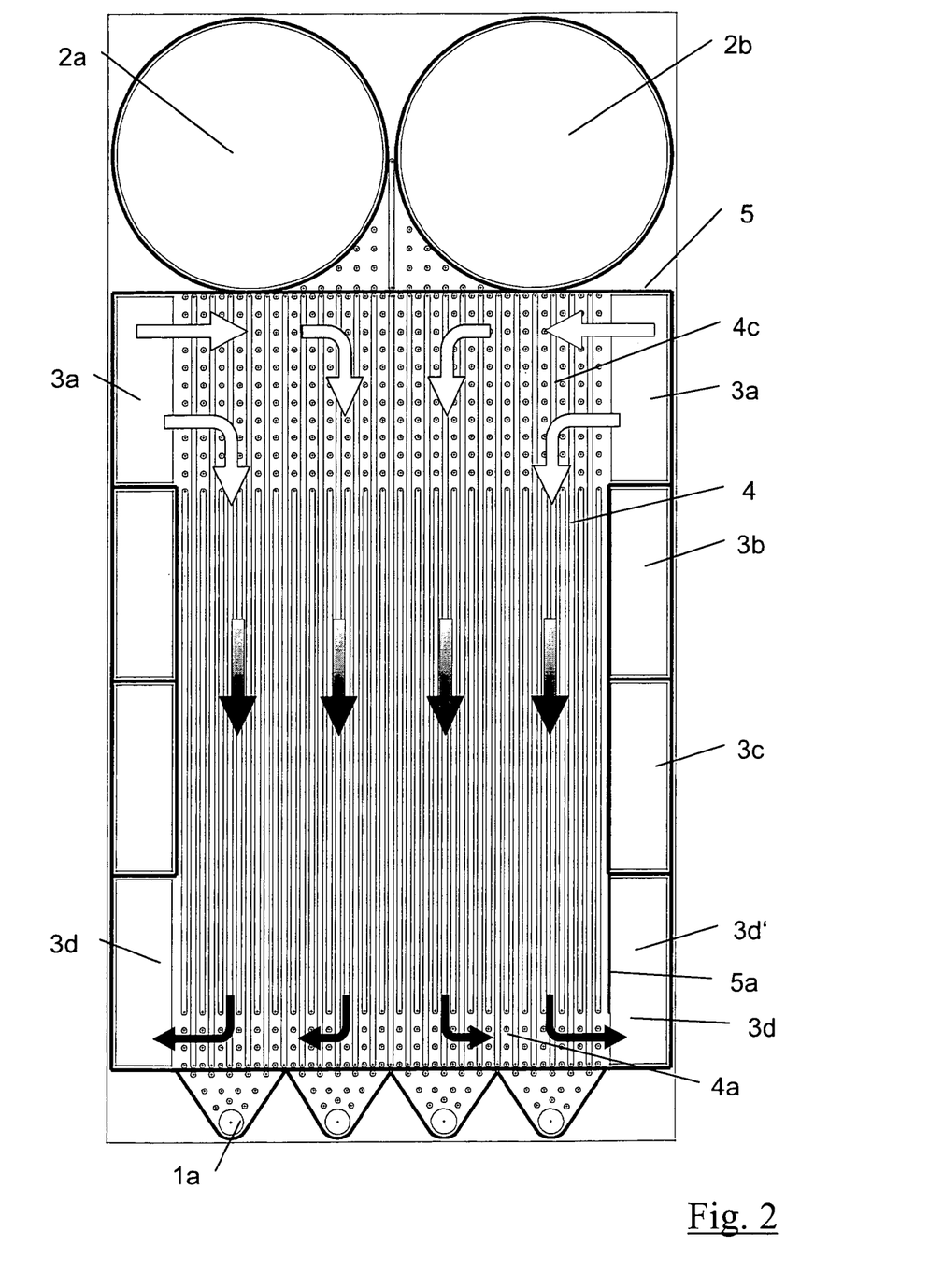
FIG. 2 is a plan view of the rear side of the plate of FIG. 1.

FIG. 2 shows the rear side of the plate of FIG. 1. It can be seen that the seal 5 is placed here in such a way that the inlet channels 1a to 1d and the outlet channels 2a, 2b for the product are sealed off with respect to the heat transfer surface 4 and that the upper steam channels 3a and the lower channels 3d, which act as condensate channels, are instead connected to the heat transfer area 4. Moreover, it becomes clear in FIG. 2 that the upper heat transfer area 4c, which allows transverse flows, is important for distributing the steam flowing in on both sides from the channels 3a over the width of the plates. The same applies to the lower heat transfer area 4a, because there the condensate must be conveyed outward again into the condensate channels 3d.

The seal 5 not only seals off the steam channels 3b and 3c with respect to the heat transfer area 4, but also between them and toward the outside, so that these channels may be optionally used for a second heating or cooling medium circulation. To interconnect the steam channels internally, only the one sealing strip situated between them need be removed on several plates.

An advantageous alternative in the form of a vertical sealing strip 5a is indicated, moreover, in FIG. 2 on the right condensate channel 3d. This sealing strip seals the upper part 3d' of the condensate channel 3d toward the heat transfer area 4, whereas the shorter lower part remains free for the condensate inlet. As a result, the upper part 3d' may function as an air collector for the condensate channel.

Figure 3:
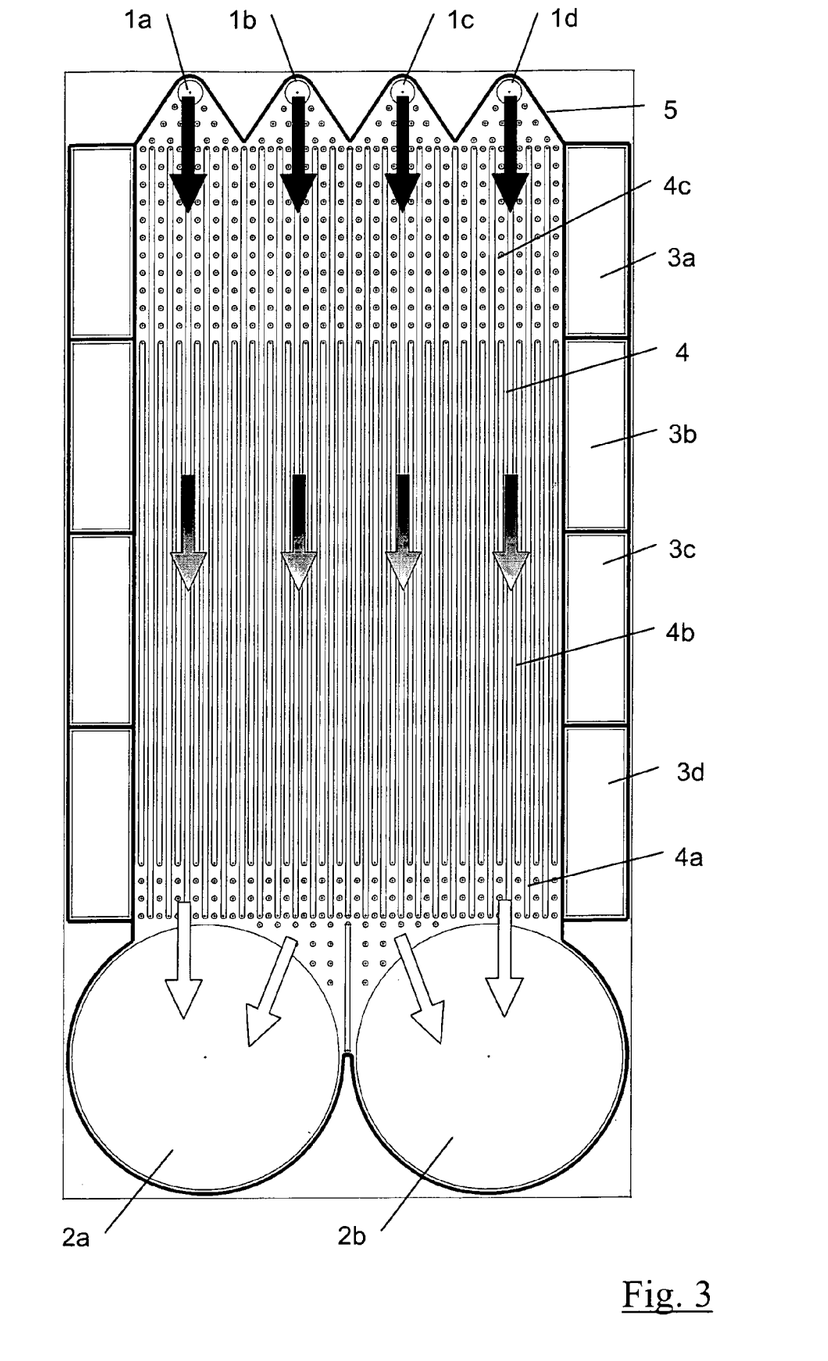
FIG. 3 is a plan view of the product side of a plate according to another embodiment of the invention in falling film evaporation.
Figure 4:
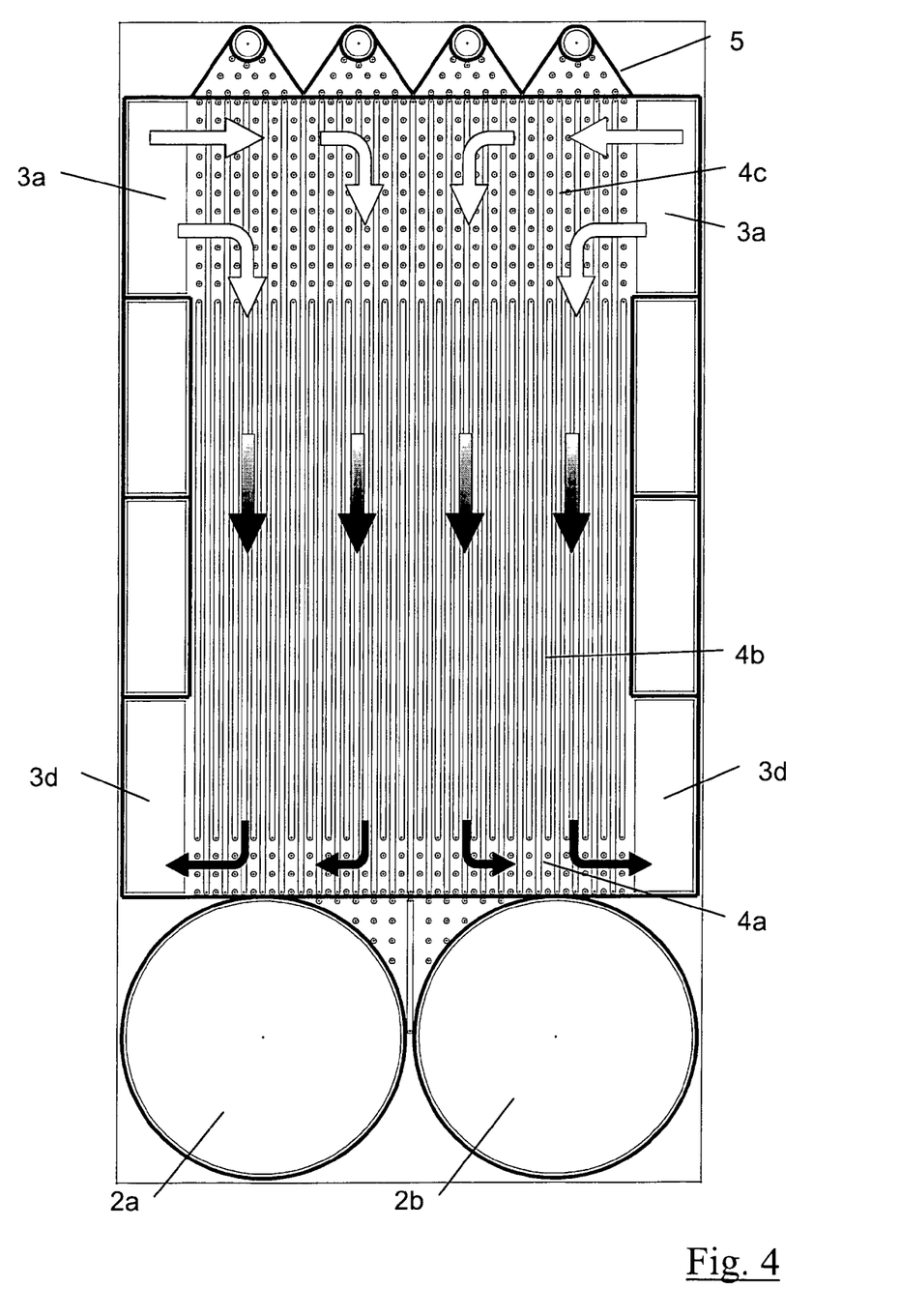
FIG. 4 is a plan view of the rear side of the plate of FIG. 3.

FIGS. 3 and 4 show the use of a plate according to the invention as a falling film evaporator. That is, the product-side inlet openings 1a to 1d are now situated on the upper narrow side of the plates and the product-side outlet openings 2a and 2b on the lower narrow side of the plates. The important point in this case is that the indentations for the seal 5 are identical to the ones described with respect to the application for the rising film evaporator of FIGS. 1 and 2. Therefore, one can work with almost the same plates in both cases, and it is only necessary to turn them by 180° about their transverse axis.

The only difference is in the partition of the heat transfer area 4 which does not make this shift. Rather, the heat transfer area 4c remains in this case. This heat transfer area 4c in the upper plate area, namely at the level of the steam supply channels 3a (see FIG. 4) advantageously has the profiling shown in FIG. 5, i.e. only flows in longitudinal direction of the plates are allowed on the product side, while on the back they are allowed both in the longitudinal direction and in the transverse direction. The lower heat transfer area 4a essentially retains its position. However, it now opens to the product-side outlet openings 2a, 2b or the condensate channels 3d respectively, and allows both longitudinal flows and transverse flows on both sides.

As a result, the same embossing die can be used for the outer area of the plates and, in particular, the sealing profiles for rising film and falling film evaporators. It is only necessary to shift the die for the heat transfer area 4 relative hereto.

Usually, the plates have upper and lower recesses for hanging in racks. These recesses (not shown in the drawings) advantageously have the same contour, so that it is possible to turn the plates about their transverse axis in the prescribed manner.

Figure 7:
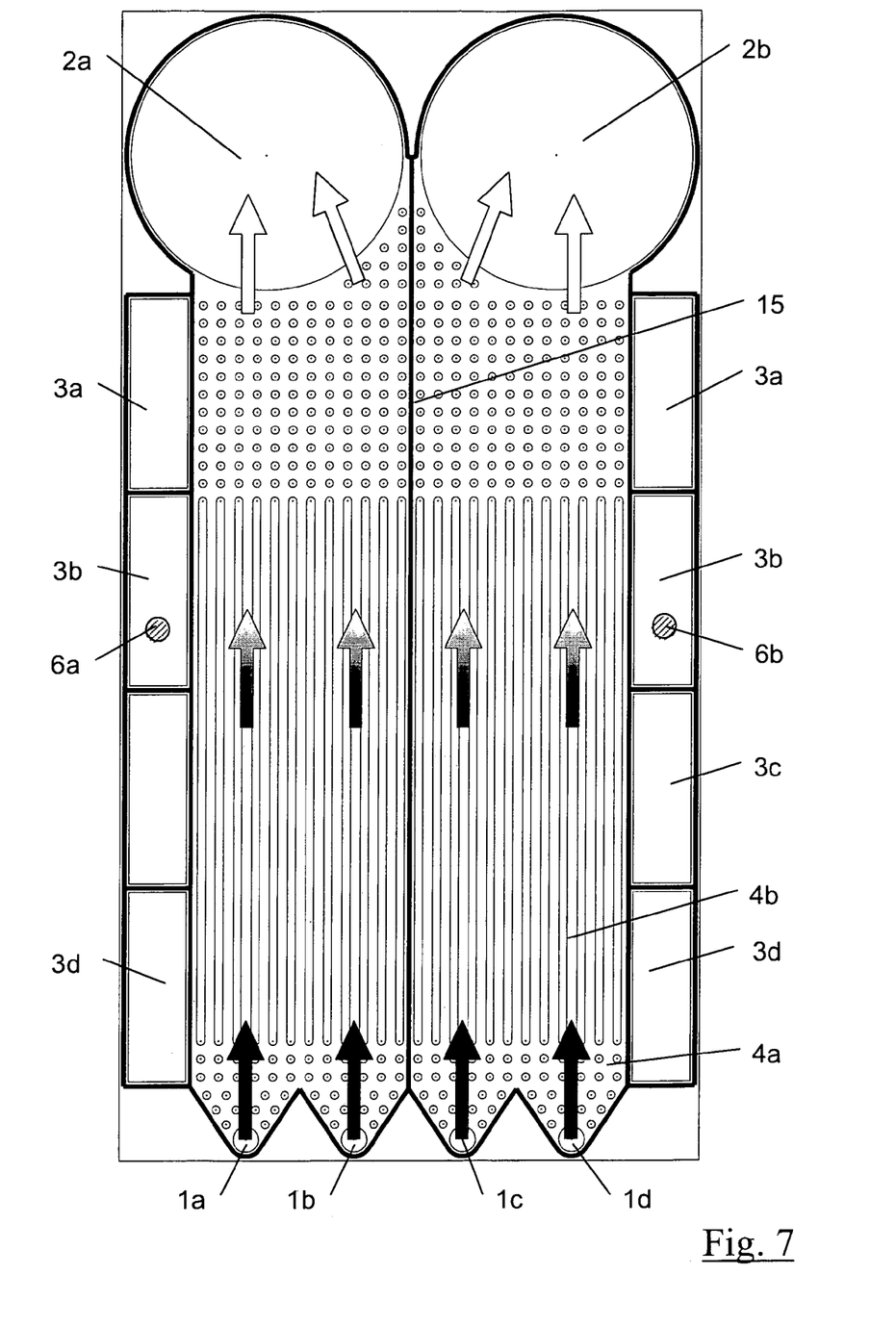
FIG. 7 is a plan view of the product side of a plate according to an embodiment of the invention showing clamps for pressing a plate packet together and a central seal in the longitudinal direction.

FIG. 7 shows the product side of a plate similar to that shown in FIG. 1, except that a seal 15 is provided running centrally in a longitudinal direction for forming two separate adjacent flow cross sections. FIG. 7 also illustrates clamps 6a and 6b placed within an unused steam channel 3b for pressing several plates together to form a plate packet.

Figure 8:
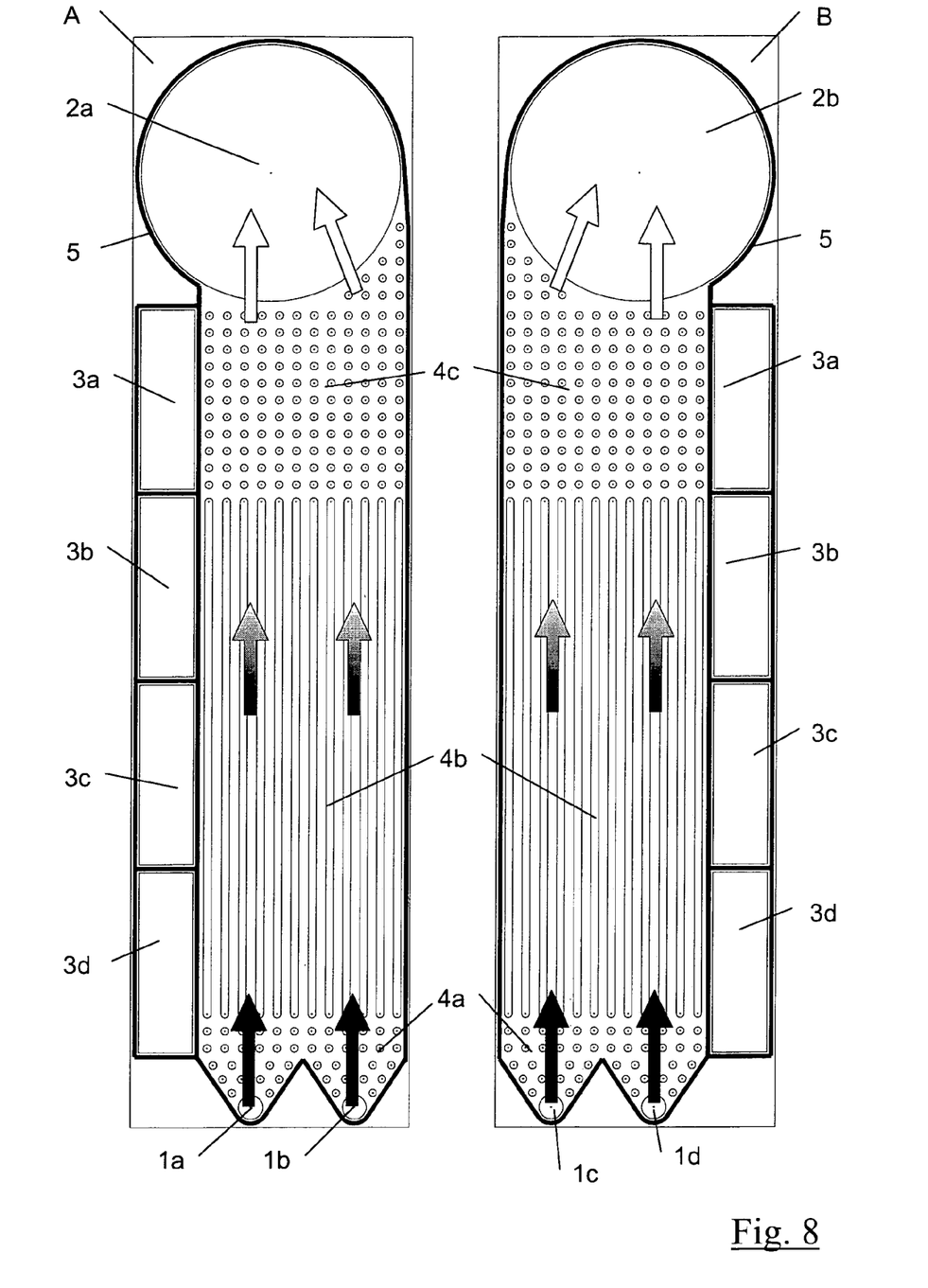
FIG. 8 is a plan view of the product side of a plate according to another embodiment of the invention with the plate divided into two plate halves.

FIG. 8 shows another embodiment of the product side of a plate similar to FIG. 1, except that the plate is divided along a central longitudinal direction into two separate plate halves A, B. The plate halves fit together in connection with other divided or non-divided plates to form a plate packet. This may be accomplished by placing clamps in the intermediate space between plate halves A and B to press the plates together in a manner similar to the clamps 6a and 6b in FIG. 7.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A heat transfer plate for a plate heat exchanger functioning as an evaporator and/or condenser, the plate comprising a heat transfer area and peripheral openings for at least first and second heat transfer media, the first heat transfer medium comprising at least one of a product to be at least partially evaporated or condensed, and a second heat transfer medium comprising at least one of a heating or a cooling medium, a first group of the openings allocated to the first medium and to a first side of the plate, a second group of the openings allocated to the second medium and a second side of the plate by appropriately placed seals, wherein the first group of openings comprises a plurality of inlet openings placed next to each other on an inlet side of the plate, the inlet openings leading directly to the heat transfer area of the plate at approximately a right angle to an edge of the plate at the inlet side of the plate, the plate further comprising a plurality of steam channels and a condensate channel, arranged adjacent to one another in a longitudinal direction of the plate alone at least one longitudinal edge, for the respective heating or cooling medium, wherein adjacent steam channels are interconnectable internally by omitting an intermediate seal between the steam channels.

2. The plate according to claim 1, wherein the inlet openings are arranged along a narrow side of the plate.

3. The plate according to claim 1, wherein the inlet openings extend over substantially an entire width of the heat transfer area.

4. The plate according to claim 1, wherein a seal situated outside the inlet openings extends into a space between each pair of neighbouring inlet openings.

5. The plate according to claim 4, wherein the seal extends further into the space between each pair of neighboring inlet openings than a distance corresponding to a diameter of the inlet openings.

6. The plate according to claim 4, wherein the seal extends in direction toward the heat transfer area for each inlet opening, while forming an expanding flow cross section.

7. The plate according to claim 1, wherein the heat transfer area has a profiling which produces, in combination with a profiling of an adjacent plate, a plurality of substantially straight individual channels, at least in a half of the plate neighbouring the inlet openings.

8. The plate according to claim 7, wherein the individual channels extend in a longitudinal direction of the plate.

9. The plate according to claim 1, wherein the heat transfer area has a profiling which allows both a transverse flow and a longitudinal flow toward the inlet opening(s) of the heating medium.

10. The plate according to claim 1, wherein the steam and condensate channels extend over substantially an entire length of at least one longitudinal edge of the plate.

11. The plate according to claim 1, wherein the condensate channel is surrounded by a seal which comprises an area which is at least 50% of an area surrounded by a seal of the steam channel which is furthest removed from the condensate channel.

12. The plate according to claim 11, wherein the area of the seal surrounding the condensate channel is at least 75% of the area surrounded by a seal of the steam channel which is furthest removed from the condensate channel.

13. The plate according to claim 11, wherein the condensate channel is formed in a desired size from the area surrounded by the seal.

14. The plate according to claim 11, wherein a channel, screened from the heat transfer area, is formed inside the condensate channel in an upper area by a seal section for condensate de-aeration.

15. The plate according to claim 1, further comprising a seal continuing centrally in a longitudinal direction for forming two separate adjacent flow cross sections on at least on one side of the plate.

16. A plate heat exchanger having plates according to claim 1.

17. The plate heat exchanger according to claim 16, wherein at least one clamp is placed within an unused steam channel for pressing several plates together.

18. The plate heat exchanger according to claim 16, wherein at least one of the plates is divided into two separate plate halves in a central longitudinal direction, the plate halves fitting together in connection with divided or non-divided plates.

19. The plate heat exchanger according to claim 18, wherein at least one clamp is placed between the plate halves for pressing two adjacent plate packets together.

* * * * *